Oct. 18, 1932.  W. F. FOUQUET  1,883,673
ADJUSTABLE MOUNT FOR PROJECTING LENSES
Filed Nov. 9, 1929  2 Sheets-Sheet 1

Inventor
WILLIAM F. FOUQUET
By Frank Keifer
Attorney

Oct. 18, 1932.  W. F. FOUQUET  1,883,673
ADJUSTABLE MOUNT FOR PROJECTING LENSES
Filed Nov. 9, 1929   2 Sheets-Sheet 2

Inventor
WILLIAM F. FOUQUET
By Frank Kiefer
Attorney

Patented Oct. 18, 1932

1,883,673

UNITED STATES PATENT OFFICE

WILLIAM F. FOUQUET, OF ROCHESTER, NEW YORK, ASSIGNOR TO PROJECTION OPTICS CO., OF ROCHESTER, NEW YORK

ADJUSTABLE MOUNT FOR PROJECTING LENSES

Application filed November 9, 1929. Serial No. 406,141.

The object of this invention is to provide a new and improved form of mount for projection lenses.

Another object of the invention is to make the mount adjustable so as to vary the magnifying power of the lenses of the optical combination so as to form on the screen an image picture of constant size with films or lantern slides of different sizes without disturbing the focus or changing the optical elements.

Another object is to provide this adjustment so that the lenses can be moved closer together or spaced further apart, and so at the same time one of the lenses can be moved sideways so as to shift the position of the picture on the screen.

Another object is to shift the position of the picture on the screen laterally by holding one edge thereof stationary on the screen and moving the other edge of the picture on the screen.

These and other objects of the invention will be illustrated in the drawings, described in the specification and pointed out in the claims at the end thereof.

In the drawings.

In the drawings like reference numerals indicate like parts.

Figure 1:
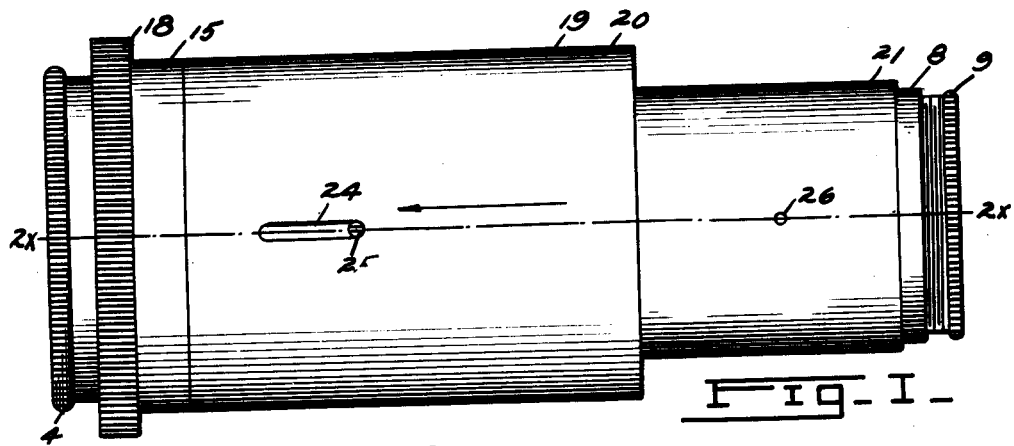
Figure 1 is a side elevation of my improved lens mount.
Figure 2:
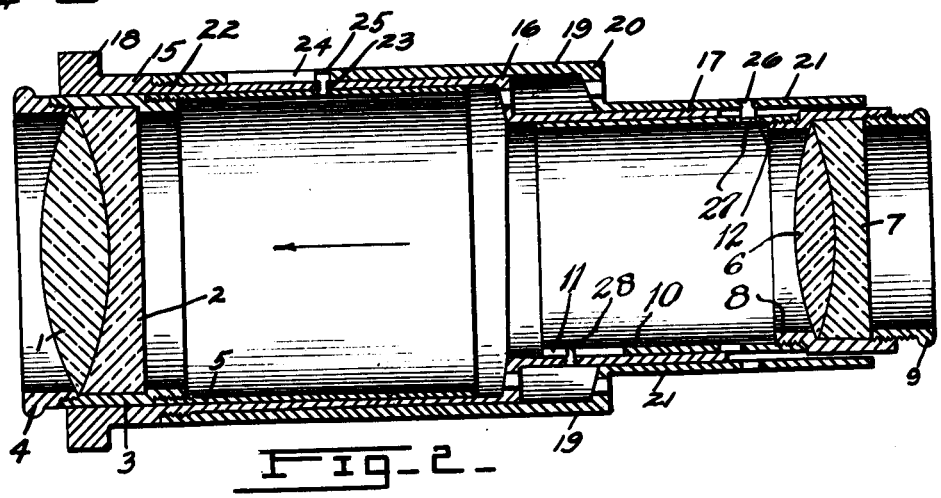
Figure 2 is a vertical section on the line 2x, 2x of Figure 1.
Figure 3:
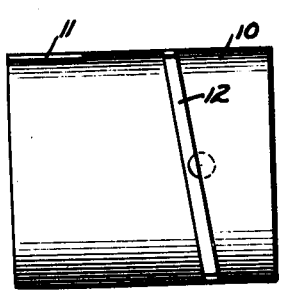
Figure 3 is a side elevation of the sleeve that carries the small doublet lens.
Figure 4:
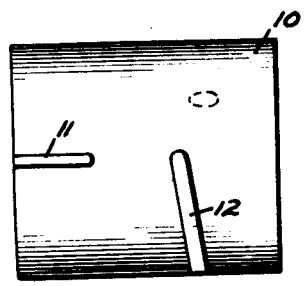
Figure 4 is a top plan view of the sleeve shown in Figure 3.
Figure 5:
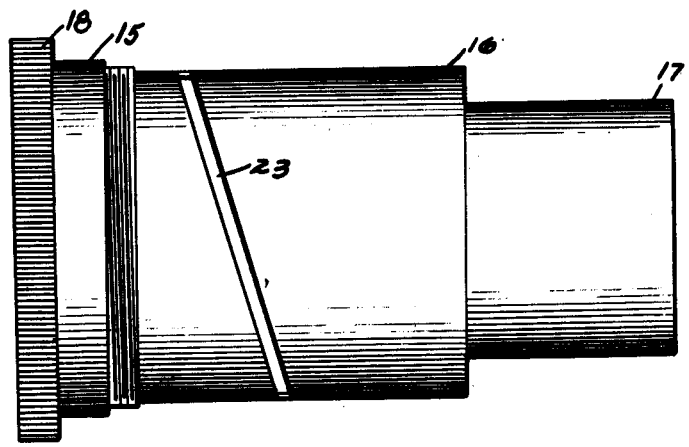
Figure 5 is a side elevation of the large cam sleeve.
Figure 6:
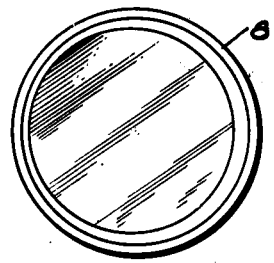
Figure 6 is an end elevation of the sleeve for holding the small doublet lens as viewed from the left in Figure 2.

In the drawings reference numerals 1 and 2 indicate the parts of the large doublet lens. These lenses are carried in the sleeve 3 and are fastened therein by a collar 4 which makes threaded engagement therewith. The sleeve 3 makes threaded engagement with the sleeve 5 which forms an extension therefor.

Reference numerals 6 and 7 indicate the parts of the small doublet lens which are carried in a sleeve 8 and are fastened therein by a collar 9 which makes threaded engagement therewith. A sleeve 10 makes threaded engagement with the sleeve 8 and forms an extension therewith. There is no cam slot in either the sleeve 3 or 5 that hold the large doublet, but the sleeve 10 that holds the small doublet is provided with a slot 11 extending longitudinally thereof and a cam slot 12 extending diagonally around the sleeve for about 180 degrees.

15 indicates a large sleeve having a large diameter as indicated at 16 and a reduced diameter as indicated at 17. This sleeve is provided with a flange 18 by which it can be turned. Partially surrounding this sleeve 15 is a sleeve 19 having a large diameter as indicated at 20 and a small diameter as indicated at 21. The sleeves 19 and 20 are joined together by threads 22 which permits the one sleeve to rotate on the other through an angle that is sufficient for the purpose of this invention. The sleeve 16 is provided with a cam slot 23 which extends diagonally about half way around the sleeve. The sleeve 19 is provided with a longitudinal slot 24. Through the longitudinal slot 24 and the diagonal cam slot 23 extends the screw 25 which makes threaded engagement with the sleeve 5 that carries the large doublet lens.

The sleeve 17 is nested in the sleeve 21, and turns therein or the sleeve 21 turns on the sleeve 17.

The sleeve 21 carries the screw 26, the heat 27 of which engages in the cam slot 12 in the sleeve 10. The sleeve 17 carries a screw 28 which engages in the longitudinal slot 11 in the sleeve 10 and holds the sleeve 10 against rotation with respect to the sleeve 17. The screw 26 engages with the cam slot 12 and as the sleeves 17 and 21 turn with respect to each other the sleeve 10 with the lens doublet 6 and 7 is moved lengthwise being held against turning by the engagement of the screw 28 with the slot 11.

The sleeves 8 and 10 on the outside are concentric with the sleeves 17 and 21. The sleeve 8 on the inside is made eccentric to the outside of the sleeves 8 and 10, (see Fig. 8) and is, therefore, eccentric to the outside of the sleeves 17 and 21. This holds the lens with its center eccentric to the axis of the outside of the sleeve 8. When the lens assembly is placed in the projection machine the line passing through the center of the lens and the axis of the outside of the sleeve 8 should be horizontal. When the sleeve 15, 16 and 17 is rotated by the flange 18 and the sleeve 19, 21 is held stationary, the sleeves 8 and 10 will rotate with the sleeve 15, 16 and 17 due to the engagement between the screw 28 and the straight slot 11. This will cause the center of the lens to move sideways when the flange 18 is turned through 180 degrees. At the same time the engagement of the screw 26 with the cam slot 12 causes the small doublet to move longitudinally in one direction and engagement of the screw 25 with the slot 23 will cause the large doublet to move longitudinally in the opposite direction. This will keep the lens assembly in focus on the screen at all times after the focus has been made and at the same time will change the size of the picture on the screen holding one side of the picture stationary, and causing the other edge of the picture to move out to enlarge the picture or to move in to make the picture smaller as it may be needed, to compensate for the difference in the size of the picture in the film.

In adjusting the lens assembly the operator takes hold of the sleeve 19 with one hand and the flange 18 with the other hand and while holding the sleeve 19 stationary he will turn the flange 18 to the right to make the picture larger and to the left to make the picture smaller. He can do this while the assembly is in position in the projection apparatus. The lenses are moved apart or together thereby changing the magnifying power of the optical system for the purpose of conrolling the size of the picture on the screen.

The further apart the lenses are spaced the smaller will be the picture on the screen. The nearer the lenses are brought together the larger will be the picture on the screen. In this way the lens can be accommodated to change the size of the picture on the screen within certain limits at will without disturbing the focus of the picture on the screen.

In the so-called movietone film, a film of standard width is used, the width of which is the same as a motion picture film of the old type or silent film, which is not used for sound reproduction. In the movietone film a part of the film is used for sound reproduction and the space allotted to the picture proper on the film is correspondingly reduced or made smaller. With the same setting of the lenses, the smaller picture on the film will throw a correspondingly smaller picture on the screen than will the larger picture on the silent film.

A movietone film sometimes follows a silent film. If the lenses of the projection apparatus are spaced apart to make the large picture on the film that is not movietone cover the screen, then with the same setting of lenses the small picture on the movietone film will throw a smaller picture that will not fill the screen. In such case the operator can turn the flange 18 with reference to the sleeve 19 and the lenses will be brought closer together thereby so that the lenses will have a higher magnification and the picture on the screen will be made correspondingly larger, and will therefore fill the screen just as fully as does the picture from the larger picture on the silent film.

Without the eccentric mounting of one of the doublets the picture would enlarge both ways from the center of the screen, and this is objectionable because the mask in the projection apparatus fixes the size of the picture and is objectionable to move the edge of the mark. The sound record is on one edge of the picture on the film and not on both edges. With the lens is set to give a lower magnification needed for the silent film, the sound record will appear on the screen at one edge of the picture, and the enlargement of the picture must be made by moving that edge of the picture leaving the other edge of the picture stationary. This result is secured by first mounting one of the doublets eccentric and by causing that doublet to rotate through 180 degrees and this is done in the manner above described.

This adustment of the distance between the lenses to compensate for the difference in the sizes of the pictures on the films can be made quickly by the operator without interfering with the continuous operation of the machine, and the continuous projection of the picture on the screen. It will be understood that the lens assembly as a whole can be adjusted back and forth to focus the picture on the screen by the usual rack and pinion apparatus, but after the focus is once obtained by the rack and pinion, the rack and pinion adjustment need not be further disturbed when the magnifying power of the lenses and the position of the picture is changed by the mount of my invention.

It will be understood that this lens assembly is placed between the film and the screen and the light goes through it from the film to the screen in the direction indicated by the arrow.

It will also be understood that the positions of the film and the screen are both fixed and the adjustment is confined to the lens assembly.

In my invention the showing of the picture is not interrupted and the picture on the screen is kept continuously in focus, and is made to fully cover the screen in either case and has the same size irrespective of whether the silent or the movietone film is used and the change from one adjustment of the lens assembly to the other adjustment is made by the operator in a few seconds using just one hand in turning the flange 18.

I claim:

1. A lens mount having a short sleeve at each end thereof, a lens in each of said short sleeves, a long sleeve in which said short sleeves are mounted to move longitudinally, means for moving said short sleeves together or apart simultaneously to change the magnification of the image picture formed by said lenses, the lens in one of said short sleeves being eccentrically mounted therein and means adapted to rotate said sleeve containing the eccentrically mounted lens whereby one edge of the picture remains substantially stationary during the change of magnification.

2. A lens mount having a short sleeve at each end thereof, a lens in each of said short sleeves, a long sleeve in which said short sleeve is mounted to slide, means for moving said short sleeves together or apart simultaneously at fixed unequal rates to change the magnification of the image picture formed by said lenses, the lens in one of said short sleeves being eccentrically mounted therein and means adapted to rotate said sleeve containing the eccentrically mounted lens whereby one edge of the picture remains substantially stationary during the change of magnification.

3. A lens mount having a short sleeve at each end thereof, a lens in each of said short sleeves, a pair of long sleeves concentric with the short sleeves and with each other, one of said long sleeves being adapted to turn while the other sleeve remains stationary, a cam slot in the long sleeve that turns, a straight slot in the stationary long sleeve intersecting with the cam slot, a pin in one of the short sleeves engaging both slots by which the short sleeve is held against turning and is moved longitudinally on the turning of the long sleeve, a straight slot in the other short sleeve, a pin in the long rotating sleeve engaging therewith by which the short sleeve is turned and left free to move longitudinally, a cam slot in said short sleeve, a pin in the long stationary sleeve adapted to engage therewith and cause the short sleeve to move in and out as it turns with the long rotating sleeve.

4. A lens mount, a lens at each end of said mount, means by which said lenses are moved longitudinally and by which one of said lenses is simultaneously moved transversely to the other lens, said means coordinating the movements of the lenses, said lenses being adapted to project a picture and change the size thereof and hold one edge of the picture substantially stationary during the change in the size of the picture.

In testimony whereof I affix my signature.

WILLIAM F. FOUQUET.